United States Patent
Molin et al.

(10) Patent No.: US 9,563,012 B2
(45) Date of Patent: Feb. 7, 2017

(54) HYBRID SINGLE-MODE AND MULTIMODE OPTICAL FIBER

(71) Applicant: Draka Comteq B.V., Amsterdam (NL)

(72) Inventors: Denis Molin, Draveil (FR); Pierre Sansonetti, Palaiseau (FR); Pierre Sillard, Le Chesnay (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 13/872,397

(22) Filed: Apr. 29, 2013

(65) Prior Publication Data

US 2013/0287353 A1    Oct. 31, 2013

(30) Foreign Application Priority Data

Apr. 27, 2012  (WO) ................. PCT/IB2012/001174

(51) Int. Cl.
*G02B 6/02* (2006.01)
*G02B 6/028* (2006.01)
*G02B 6/036* (2006.01)

(52) U.S. Cl.
CPC ......... *G02B 6/02042* (2013.01); *G02B 6/0288* (2013.01); *G02B 6/03633* (2013.01)

(58) Field of Classification Search
CPC ... G02B 6/0281; G02B 6/0283; G02B 6/0285; G02B 6/0286
USPC ........................................ 385/124, 125, 127
See application file for complete search history.

(56) References Cited

U.S. PATENT DOCUMENTS

| | | |
|---|---|---|
| 4,838,643 A | 6/1989 | Hodges et al. |
| 5,194,714 A | 3/1993 | Le Sergent |
| 5,416,862 A * | 5/1995 | Haas ................. G02B 6/24 385/27 |
| 5,522,007 A | 5/1996 | Drouart et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |

(Continued)

FOREIGN PATENT DOCUMENTS

| | | |
|---|---|---|
| AU | 2002/100296 A4 | 5/2002 |
| CA | 1137760 A1 | 12/1982 |

(Continued)

OTHER PUBLICATIONS

International Search Report in counterpart International Application No. PCT/IB/001174 dated Jan. 16, 2013, pp. 1-3.

(Continued)

*Primary Examiner* — Ryan Lepisto
(74) *Attorney, Agent, or Firm* — Additon, Higgins & Pendleton, P.A.

(57) ABSTRACT

A hybrid optical fiber integrates features of multimode optical fibers and single-mode optical fibers. The hybrid optical fiber possesses an optical core having a first core region and a second core region to provide improved optical mode coupling ratio for single-mode transmission while maintaining a broad bandwidth for multimode transmission. The hybrid optical fiber's optical core may optionally include a depressed trench positioned between the optical core's first core region and the optical core's second core region to reduce modal dispersion and to improve modal bandwidth during multimode transmissions.

14 Claims, 6 Drawing Sheets

(56) References Cited

U.S. PATENT DOCUMENTS

| | | |
|---|---|---|
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,336,877 B2 | 2/2008 | Bickham |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,025 B2 | 3/2012 | de Montmorillon et al. |
| 8,145,026 B2 | 3/2012 | Overton et al. |
| 8,165,439 B2 | 4/2012 | Overton |
| 8,195,018 B2 | 6/2012 | Overton et al. |
| 8,259,389 B2 | 9/2012 | Pastouret et al. |
| 8,265,442 B2 | 9/2012 | Overton |
| 8,274,647 B2 | 9/2012 | Gholami et al. |
| 8,280,213 B2 | 10/2012 | Molin et al. |
| 8,290,324 B2 | 10/2012 | Sillard et al. |
| 8,301,000 B2 | 10/2012 | Sillard et al. |
| 8,306,380 B2 | 11/2012 | Leatherman et al. |
| 8,314,408 B2 | 11/2012 | Hartsuiker et al. |
| 8,340,488 B2 | 12/2012 | Molin et al. |
| 8,346,040 B2 | 1/2013 | Testu et al. |
| 8,391,661 B2 | 3/2013 | Molin et al. |
| 8,401,353 B2 | 3/2013 | Barker et al. |
| 8,406,593 B2 | 3/2013 | Molin et al. |
| 8,428,410 B2 | 4/2013 | Molin et al. |
| 8,428,411 B2 | 4/2013 | de Montmorillon et al. |
| 2002/0114599 A1 | 8/2002 | Halgren et al. |
| 2003/0161597 A1 | 8/2003 | Berkey et al. |
| 2004/0202423 A1* | 10/2004 | White .............. G02B 6/0288 385/39 |
| 2007/0196061 A1 | 8/2007 | Bickham et al. |
| 2008/0292262 A1 | 11/2008 | Overton et al. |
| 2009/0214167 A1 | 8/2009 | Lookadoo et al. |
| 2009/0297107 A1 | 12/2009 | Tatat |
| 2010/0021170 A1 | 1/2010 | Lumineau et al. |
| 2010/0119202 A1 | 5/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0154479 A1 | 6/2010 | Milicevic et al. |
| 2010/0166375 A1 | 7/2010 | Parris |
| 2010/0189397 A1 | 7/2010 | Richard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0310218 A1 | 12/2010 | Molin et al. |
| 2011/0026889 A1 | 2/2011 | Risch et al. |
| 2011/0058781 A1 | 3/2011 | Molin et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123162 A1 | 5/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0213483 A1 | 8/2012 | Risch et al. |
| 2012/0224254 A1 | 9/2012 | Burov et al. |
| 2012/0243843 A1 | 9/2012 | Molin et al. |
| 2012/0251062 A1 | 10/2012 | Molin et al. |
| 2012/0275751 A1 | 11/2012 | Krabshuis et al. |
| 2012/0301093 A1 | 11/2012 | Sillard et al. |
| 2012/0315006 A1 | 12/2012 | Bigot-Astruc et al. |
| 2013/0004135 A1 | 1/2013 | Bigot-Astruc et al. |
| 2013/0028564 A1 | 1/2013 | Molin et al. |
| 2013/0167593 A1 | 7/2013 | Milicevic et al. |
| 2013/0175437 A1 | 7/2013 | Burov et al. |
| 2013/0209044 A1 | 8/2013 | Lowell et al. |
| 2013/0287353 A1 | 10/2013 | Molin et al. |

FOREIGN PATENT DOCUMENTS

| | | |
|---|---|---|
| EP | 1921478 A1 | 5/2008 |
| EP | 2657734 A1 | 10/2013 |
| FR | 2441585 A1 | 6/1980 |
| JP | 02-073203 A | 3/1990 |
| WO | 2009/062131 A1 | 5/2009 |
| WO | 2013/160714 A1 | 10/2013 |

OTHER PUBLICATIONS

Written Opinion of the International Searching Authority in counterpart International Application No. PCT/IB/001174 dated Jan. 16, 2013, pp. 1-9.

Extended European Search Report in counterpart European Application No. 13165638 dated Aug. 7, 2013, pp. 1-9.

Tanobe et al., "Dual-Mode Fibre (DMF) capable of single- and multi-mode transmission", ECOC, 2007, pp. 1-2.

(56) References Cited

OTHER PUBLICATIONS

Liu et al., "Experimental Verification of a Ne Model Describing the Influence of Incomplete Signal Extinction Ratio on the Sensitivity Degradation Due to Multiple Interferometric Crosstalk", IEEE Photonics Technology Letters, vol. 11, No. 1, Jan. 1999, pp. 137-139.

\* cited by examiner

HYBRID SINGLE-MODE AND MULTIMODE OPTICAL FIBER

CROSS-REFERENCE TO PRIORITY APPLICATION

This application claims the benefit of commonly assigned International Application No. PCT/IB2012/001174 for a Hybrid Single and Multimode Optical Fiber for a Home Network (filed Apr. 27, 2012, under the Patent Cooperation Treaty at the National Institute of Industrial Property, France) via 35 U.S.C. §365(a). International Application No. PCT/IB2012/001174 is hereby incorporated by reference in its entirety.

FIELD OF THE INVENTION

The invention relates to fiber-optic transmission and, more specifically, to an optical fiber for a home network that supports both single-mode and multimode transmissions.

BACKGROUND

An optical fiber conventionally includes an optical core, which transmits an optical signal, and an optical cladding, which confines the optical signal within the optical core. To that end, the refractive index of the core, $n_c$, is greater than the refractive index of the cladding, $n_g$ (i.e., $n_c > n_g$). An optical fiber is generally characterized by a refractive index profile that associates the refractive index (n) with the radius (r) of the optical fiber: the distance r with respect to the center of the optical fiber is shown on x-axis and the difference between the refractive index at radius r and the refractive index of the optical cladding is shown on y-axis.

Generally speaking, two main categories of optical fibers exist: multimode optical fibers and single-mode optical fibers. In a multimode optical fiber, for a given wavelength, several optical modes are propagated simultaneously along the optical fiber, whereas in a single-mode optical fiber, the higher order modes (hereafter called HOMs) are strongly attenuated.

Single-mode optical fibers are commonly used for long-distance applications, such as access networks. To obtain an optical fiber capable of transmitting a single-mode optical signal, a core with a relatively small diameter is required (typically between 5 microns and 11 microns). To meet requirements of high bandwidth applications for access networks (e.g., 10 Gbps), standard single-mode optical fibers require the use of a modulated single-mode laser emitter for transmission at a wavelength of 1550 nanometers (nm).

Multimode optical fibers are commonly used for short-distance applications requiring a high bandwidth, such as local area networks (LANs) and multi-dwelling units (MDUs), more generally known as in-building networks. The core of a multimode optical fiber typically has a diameter of 50 microns ($\mu m$) or 62.5 microns. Multimode optical fibers have been the subject of international standardization, which define criteria of bandwidth, numerical aperture, and core diameter for a given wavelength. The OM3 and OM4 standards have been adopted to meet the demands of high-bandwidth applications (typically 10 Gbps) over long distances (a few tens to a few hundreds of meters), such as in the Ethernet high speed transmission networks. The OM3 standard requires, at a wavelength of 850 nanometers, an efficient modal bandwidth (hereafter called EMB) of at least 2,000 MHz·km to ensure error-free multimode transmissions of 10 Gbps up to a distance of 300 meters. The OM4 standard requires, at a wavelength of 850 nanometers, an EMB of at least 4,700 MHz·km to ensure error-free multimode transmissions of 10 Gbps up to a distance of 400 meters.

The most prevalent multimode optical fibers in telecommunications are the graded-index optical fibers. A graded-index refractive index profile can help to reduce intermodal dispersion (i.e., the difference between the propagation delay times or group velocity of the optical modes along the optical fiber) and achieve a high modal bandwidth for a given wavelength.

For the development of an optical home network, the choice of optical fiber is important. Multimode optical fiber is a cost-effective solution for optical data networks. With their wider numerical aperture, larger core diameter, and low modal dispersion provided by their graded-index core profile, multimode optical fibers can efficiently support 10 Gbps optical signals emitted by cost-effective, light-source-based solutions (such as Vertical Cavity Surface Emitting Laser or VCSEL), whereas single-mode optical fibers require expensive and tolerant single-mode transceivers. In particular, the connection of the light source to the single-mode optical fiber (e.g., launching conditions) requires tighter alignment tolerances than with the multimode optical fiber.

Nonetheless, an optical home network is expected to successfully connect to outside access networks, which mainly use single-mode technology because of longer reach requirements. Thus, the problem of interoperability with single-mode optical fibers needs further consideration.

In practice, multimode optical fibers are not designed to be interconnected with single-mode optical transmission systems. A home network can be seen as a network of optical fibers that enables users to connect devices at both ends of the network. Today, these devices are likely to implement multimode-transmission-based technologies that require multimode optical fibers, but tomorrow they might be designed to also operate with a single-mode-based technology. Thus, the installation of optical fiber, which is relatively costly, would have to be repeated whenever the access networks are ready to work with the optical home networks.

Therefore, it would be desirable to provide an optical fiber for a home network that can transmit both error-free multimode optical signals at an operating wavelength of the home network (e.g., 850 nanometers) and error-free single-mode optical signals at an operating wavelength of an access network (e.g., 1550 nanometers).

One proposed solution would consist of using a standard multimode optical fiber that has a refractive graded-index profile optimized for providing error-free transmission with a broad bandwidth at a wavelength of 850 nanometers. Nevertheless, when a single-mode source operating at a wavelength of 1550 nanometers is coupled to the standard multimode optical fiber, the optical signal injected in the fiber stimulates mainly the fundamental optical mode but also the optical fiber's HOMs. Indeed, a part of the optical power is coupled into the fundamental mode of the standard multimode optical fiber, and almost all of the remaining power is coupled into the set of HOMs of the optical fiber (e.g., corresponding to parasitic signal or optical noise). Because the different modes have different propagation delay times and propagation constants, on the receiver side both optical signals carried by the fundamental mode and the HOMs interfere, leading to power fluctuations that degrade the quality of the optical transmission. Therefore, due to mode field mismatch at 1550 nanometers between the fundamental modes carried by a standard multimode optical fiber and a standard single-mode optical fiber, such a standard multimode optical fiber is not adapted to an interconnection with a single-mode optical transmission system.

Australian Patent Publication No. 2002/100296, which is hereby incorporated by reference in its entirety, discloses an optical fiber that includes a single-mode core part, which has a first refractive index, surrounded by a multimode core part, which has a second refractive index, finally surrounded by a cladding, which has a third refractive index. This publication does not describe the conditions for the fiber profile to enable sufficient error-free single-mode transmission at 1550 nanometers. The disclosed optical fiber further presents a relatively low bandwidth at 850 nanometers. This publication does not address the problem of reduction of noise caused by the optical fiber's HOMs.

French Patent Publication No. 2,441,585, which is hereby incorporated by reference in its entirety, discloses a single-mode or multimode optical fiber with a central single-mode core and a multimode sheath for data transmission. In particular, the disclosed optical fiber does not exhibit a refractive graded-index core profile, which is critical for high speed performances at 850 nanometers. This publication does not describe the conditions for the fiber profile to provide sufficient error-free single-mode and multimode transmission, nor does it address the problem of reduction of the optical power coupled into the optical fiber's HOMs.

Accordingly, a need exists for an optical fiber that addresses these various drawbacks.

SUMMARY

In one aspect, the invention embraces a hybrid optical fiber that integrates features of multimode optical fibers (e.g., the ability to be used with high-speed VCSEL-based sources) and single-mode optical fibers. The hybrid optical fiber is especially suited for home networks and other high-data rate applications.

In one embodiment, the hybrid optical fiber can transmit error-free multimode optical signals at an operating wavelength of a home network (typically 850 nanometers) and error-free single-mode optical signals at an operating wavelength of an access network (typically 1550 nanometers).

In another embodiment, the hybrid optical fiber has an improved optical mode coupling ratio for single-mode transmission while maintaining a broad bandwidth for multimode transmission over a few tens of meters.

In yet another embodiment, the hybrid optical fiber has a relatively low modal dispersion for the multimode transmission and sustains a fundamental mode similar to that of a standard single-mode optical fiber.

In an exemplary embodiment, the optical fiber includes a central optical core and an optical cladding that surrounds the optical core. The optical core itself includes a first core region and a second core region that surrounds the first core region. The optical core's first and second core regions are designed so that the optical core has a refractive index profile n(r) defined by the following equation:

$$n(r) = \begin{cases} n_0 \cdot \sqrt{1 - 2 \cdot \Delta \cdot \left(\frac{r}{a}\right)^\alpha} + \Delta_s & r < a_s \\ n_0 \cdot \sqrt{1 - 2 \cdot \Delta \cdot \left(\frac{r}{a}\right)^\alpha} & a_s \leq r < a \end{cases}$$

wherein, $a_s$ is the radius of the first core region;
a is the radius of the second core region (e.g., at least about 15 to 20 microns);
$\Delta_s$ is a step-index defined by the refractive index difference between the first core region and the second core region;
$n_0$ is the maximum refractive index of the second core region;
$\alpha$ is a non-dimensional parameter that defines the index profile shape of the second core region, and $\alpha \geq 1$ (e.g., $1 \leq \alpha \leq 5$);
$\Delta$ is the normalized refractive index difference, and $$\Delta = \frac{n_0^2 - n_1^2}{2n_0^2},$$

$n_1$ being the minimal refractive index of the second core region.

In another exemplary embodiment, the optical fiber includes a central optical core and an optical cladding that surrounds the optical core. The optical core itself includes a first core region and a second core region that surrounds the first core region. The optical core's first and second core regions are designed so that the optical core has a refractive index profile n(r) defined by the following equation:

$$n(r) = \begin{cases} n_0 + \Delta_s & r < a_s \\ n_0 \cdot \sqrt{1 - 2 \cdot \Delta \cdot \left(\frac{r}{a}\right)^\alpha} & a_s \leq r < a \end{cases}$$

wherein, $a_s$ is the radius of the first core region;
a is the radius of the second core region (e.g., at least about 15 to 20 microns);
$\Delta_s$ is a step-index defined by the refractive index difference between the first core region and the second core region;
$n_0$ is the maximum refractive index of the second core region;
$\alpha$ is a non-dimensional parameter that defines the index profile shape of the second core region, and $\alpha > 1$ (e.g., $1 \leq \alpha \leq 5$);
$\Delta$ is the normalized refractive index difference, and $$\Delta = \frac{n_0^2 - n_1^2}{2n_0^2},$$

$n_1$ being the minimal refractive index of the second core region.

In general, the present hybrid optical fiber includes a multi-segmented optical core having a refractive graded-index profile that is typically used to support multimode transmission, albeit with a step-index (e.g., a refractive-index discontinuity) added at the center of the optical core. The profile parameters $a_s$ and $\Delta_s$ of this step-index are selected to provide an optical fiber that transmits both error-free multimode optical signals and error-free single-mode optical signals.

Indeed, the astute implementation of such an optical-core refractive index profile n(r), as well as the choice of satisfactory values for the parameters $a_s$ and $\Delta_s$, facilitate outstanding performance. For example, the optical power coupled into the resulting optical fiber's fundamental mode is maximized at the wavelength of the single-mode transmission (e.g., 1550 nanometers) while preserving a relatively reduced modal dispersion at the wavelength of the multimode transmission (e.g., 850 nanometers).

The refractive-index profile of the optical fiber's second core region presents the typical characteristics of a multimode optical fiber (e.g., a multimode optical fiber operating at a wavelength of 850 nanometers). The first core region provides a radial portion of the optical fiber having a step-index profile. The first core region's characteristics with respect to the second core region enable the imposition of single-mode transmission conditions when single-mode optical signals are injected into the optical fiber yet maintain the optical fiber's multimode characteristics when multimode optical signals are injected into the optical fiber.

The present hybrid optical fiber employs optical-mode matching that, in accordance with the foregoing refractive profile n(r), facilitates the combination of both features of a multimode optical fiber and features of a single-mode optical fiber, albeit with a satisfactory trade-off in terms of optical properties. In accordance with the present invention, whether the first core region has a graded-index profile or a constant-index profile, the foregoing technical effects are essentially the same.

In addition, as will be appreciated by those having ordinary skill in the art, the present hybrid optical fiber is relatively straightforward and cost-effective to manufacture, requiring only the adaptation of the optical core's doping as a function of the desired refractive-index profile.

In one exemplary optical-fiber embodiment, the radius $a_s$ of the first optical core region is between about 1.5 microns and 9 microns (e.g., 2 microns to 7 microns, such as about 4 microns, or 1.5 microns to 4.5 microns, such as about 3 microns). This dimensional range facilitates the radial injection offset in multimode transmission.

In another exemplary optical-fiber embodiment, (i) the refractive index difference $\Delta_s$ between the first core region and the second core region and (ii) the radius $a_s$ of the first core region satisfy the following inequality:

$$0.0549 \cdot a_s^4 - 0.9053 \cdot a_s^3 + 5.483 \cdot a_s^2 - 14.39 \cdot a_s + 13.75 < 1000 \cdot \Delta_s < 1.11 \cdot a_s^2 - 6.9145 \cdot a_s + 17.94.$$

In yet another exemplary optical-fiber embodiment, (i) the refractive index difference $\Delta_s$ between the first core region and the second core region and (ii) the radius $a_s$ of the first core region satisfy the following inequality:

$$0.0373 \cdot a_s^4 - 0.6145 \cdot a_s^2 + 4.0286 \cdot a_s^2 - 12.217 \cdot a_s + 14.739 < 1000 \cdot \Delta_s < 0.9821 \cdot a_s^2 - 6.5036 \cdot a_s + 16.7.$$

In another exemplary optical-fiber embodiment, the radius a of the second core region is 25 microns±2 microns, and (i) the refractive index difference $\Delta_s$ between the first core region and the second core region and (ii) the radius $a_s$ of the first core region satisfy the following inequality:

$$0.17173a_s^2 - 1.6926a_s + 5.1835 < \Delta_s < 0.26184a_s^2 - 3.1935a_s + 10.5832.$$

The optical fiber can thereby have a power-coupling ratio greater than 98 percent at a wavelength of 1550 nanometers and a bandwidth of 10 Gbps at a wavelength of 850 nanometers for a 30-meter length of optical fiber.

In yet another exemplary optical-fiber embodiment, the radius a of the second core region is 25 microns±2 microns, and (i) the refractive index difference $\Delta_s$ between the first core region and the second core region and (ii) the radius $a_s$ of the first core region satisfy the following inequality:

$$0.31742a_s^2 - 2.9046a_s + 8.3221 < \Delta_s < 0.26184a_s^2 - 3.1935a_s + 10.5832.$$

The optical fiber can thereby have a power-coupling ratio greater than 99 percent at a wavelength of 1550 nanometers and a bandwidth of 10 Gbps at a wavelength of 850 nanometers for a 30-meter length of optical fiber.

In yet another exemplary optical-fiber embodiment, the radius a of the second core region is 25 microns±2 microns, and (i) the refractive index difference $\Delta_s$ between the first core region and the second core region and (ii) the radius $a_s$ of the first core region satisfy the following inequality:

$$0.17173a_s^2 - 1.6926a_s + 5.1835 < \Delta_s < 0.21308a_s^2 - 2.3168a_s + 6.9690.$$

The optical fiber can thereby have a power-coupling ratio greater than 98 percent at a wavelength of 1550 nanometers and a bandwidth of 10 Gbps at a wavelength of 850 nanometers for a 50-meter length of optical fiber.

In another exemplary optical-fiber embodiment, the radius a of the second core region is 31.25 microns±2 microns, and (i) the refractive index difference $\Delta_s$ between the first core region and the second core region and (ii) the radius $a_s$ of the first core region satisfy the following inequality:

$$0.13774a_s^2 - 1.3462a_s + 4.0572 < \Delta_s < 0.22044a_s^2 - 2.7607a_s + 9.7057.$$

The optical fiber can thereby have a power-coupling ratio greater than 98 percent at a wavelength of 1550 nanometers and a bandwidth of 10 Gbps at a wavelength of 850 nanometers for a 30-meter length of optical fiber.

In yet another exemplary optical-fiber embodiment, the radius a of the second core region is 31.25 microns±2 microns, and (i) the refractive index difference $\Delta_s$ between the first core region and the second core region and (ii) the radius $a_s$ of the first core region satisfy the following inequality:

$$0.2839a_s^2 - 2.5787a_s + 7.2847 < \Delta_s < 0.22044a_s^2 - 2.7607a_s + 9.7057.$$

The optical fiber can thereby have a power-coupling ratio greater than 99 percent at a wavelength of 1550 nanometers and a bandwidth of 10 Gbps at a wavelength of 850 nanometers for a 30-meter length of optical fiber.

In yet another exemplary optical-fiber embodiment, the radius a of the second core region is 31.25 microns±2 microns, and (i) the refractive index difference $\Delta_s$ between the first core region and the second core region and (ii) the radius $a_s$ of the first core region satisfy the following inequality:

$$0.13774a_s^2 - 1.3462a_s + 4.0572 < \Delta_s < 0.15979a_s^2 - 1.8078a_s + 5.9286.$$

The optical fiber can thereby have a power-coupling ratio greater than 98 percent at a wavelength of 1550 nanometers and a bandwidth of 10 Gbps at a wavelength of 850 nanometers for a 50-meter length of optical fiber.

In another exemplary optical-fiber embodiment, the radius a of the second core region is 40 microns±2 microns, and (i) the refractive index difference $\Delta_s$ between the first core region and the second core region and (ii) the radius $a_s$ of the first core region satisfy the following inequality:

$$0.20185a_s^2 - 2.0205a_s + 6.2914 < \Delta_s < 0.26946a_s^2 - 3.5101a_s + 12.8205.$$

The optical fiber can thereby have a power-coupling ratio greater than 98 percent at a wavelength of 1550 nanometers and a bandwidth of 10 Gbps at a wavelength of 850 nanometers for a 30-meter length of optical fiber.

In yet another exemplary optical-fiber embodiment, the radius a of the second core region is 40 microns±2 microns, and (i) the refractive index difference $\Delta_s$ between the first core region and the second core region and (ii) the radius $a_s$ of the first core region satisfy the following inequality:

$0.34616a_s^2-3.211a_s+9.3320<\Delta_s<0.26946a_s^2-3.5101a_s+12.8205.$

The optical fiber can thereby have a power-coupling ratio greater than 99 percent at a wavelength of 1550 nanometers and a bandwidth of 10 Gbps at a wavelength of 850 nanometers for a 30-meter length of optical fiber.

In yet another exemplary optical-fiber embodiment, the radius a of the second core region is 40 microns±2 microns, and (i) the refractive index difference $\Delta_s$ between the first core region and the second core region and (ii) the radius $a_s$ of the first core region satisfy the following inequality:

$0.20185a_s^2-2.0205a_s+6.2914<\Delta_s<0.20605a_s^2-2.4798a_s+8.3655.$

The optical fiber can thereby have a power-coupling ratio greater than 98 percent at a wavelength of 1550 nanometers and a bandwidth of 10 Gbps at a wavelength of 850 nanometers for a 50-meter length of optical fiber.

In an alternative embodiment, the core further includes a depressed trench (e.g., a depressed area or region) that is positioned between the optical core's first core region and the optical core's second core region. In this regard, the depressed trench may be contiguously positioned between the optical core's first core region and the optical core's second core region. The depressed trench, which defines a refractive index difference $\Delta_d$ with respect to the second core region, typically has a width $w_d$ of between about 1 micron and 8 microns (e.g., between about 2 microns and 6 microns, such as 3-5 microns).

In an exemplary embodiment, (i) the refractive index difference $\Delta_s$ between the first core region and the second core region and (ii) the refractive index difference $\Delta_d$ between the depressed trench and the second core region satisfy the following inequality:

$0.0549 \cdot a_s^4 - 0.9053 \cdot a_s^3 + 5.483 \cdot a_s^2 - 14.39 \cdot a_s + 13.75 < 1000 \cdot (\Delta_s + |\Delta_d|) < 1.11 \cdot a_s^2 - 6.9145 \cdot a_s + 17.94.$ Including a depressed trench between the optical core's first core region and the optical core's second core region further improves the modal bandwidth at 850 nanometers.

In another aspect, the invention embraces an optical system, such as an optical home network, that includes one or more of the foregoing hybrid optical fibers.

In yet another aspect, the invention embraces cost-effective methods for manufacturing the foregoing hybrid optical fibers.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a hybrid optical fiber that integrates features of multimode optical fibers and single-mode optical fibers.

Figure 1:
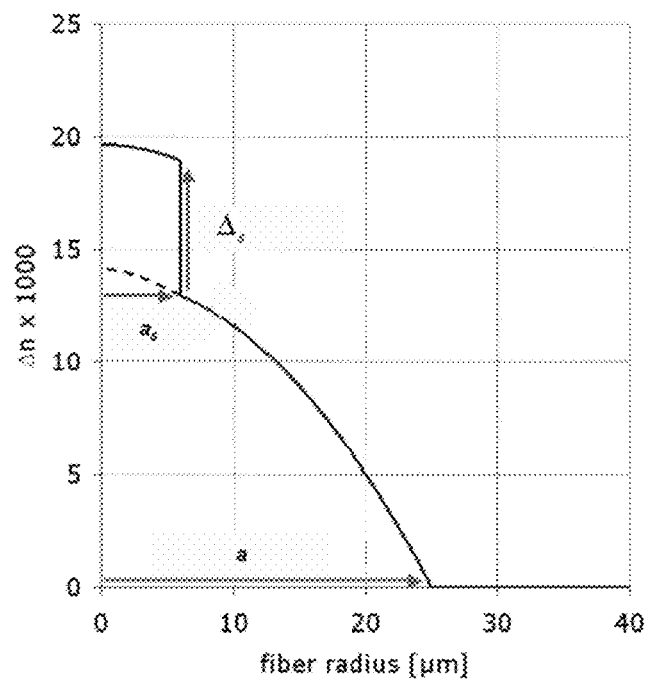
FIG. 1 graphically depicts the refractive index profile of a first embodiment of an exemplary optical fiber according to the present invention.

In this regard, FIG. 1 depicts the refractive index profile of an exemplary optical fiber according to a first embodiment of the present invention. FIG. 1 describes the relationship between the refractive index value n and the distance r from the center of the optical fiber.

In one aspect, the hybrid optical fiber has a refractive index profile n(r) defined by the following equation:

$$n(r) = \begin{cases} n_0 \cdot \sqrt{1 - 2 \cdot \Delta \cdot \left(\frac{r}{a}\right)^\alpha} + \Delta_s & r < a_s \\ n_0 \cdot \sqrt{1 - 2 \cdot \Delta \cdot \left(\frac{r}{a}\right)^\alpha} & a_s \leq r < a \\ n_0 \cdot \sqrt{1 - 2 \cdot \Delta} & a \leq r \end{cases}$$

where, $a_s$ is the radius of the first core region;

a is the radius of the second core region;

$\Delta_s$ is a positive refraction index-step defined by the refractive index difference between the first core region and the second core region at $r=a_s$;

$n_0$ is the maximum refractive index of the second core region;

α is a non-dimensional parameter that defines the index profile shape of the second core region, and $\alpha \geq 1$;

Δ is the normalized refractive index difference, and $$\Delta = \frac{n_0^2 - n_1^2}{2n_0^2},$$

$n_1$ being the minimum refractive index of the second core region.

The optical fiber includes an optical core for 0<r<a and an optical cladding a≤r surrounding the optical core. The optical fiber's optical cladding typically has a standard, constant refractive index such as: $n_0 \cdot \sqrt{1-2\cdot\Delta}$. That said, it is within the scope of the present invention to include at least one depressed trench within the optical cladding (e.g., positioned near but beyond the central core's outermost radius).

The optical fiber's optical core includes a first core region having a radius $a_s$ and a refractive step-index with respect to a second core region (e.g., a refractive-index discontinuity as depicted in FIG. 1), with a refractive index profile such as:

$$n_0 \cdot \sqrt{1-2\cdot\Delta\cdot\left(\frac{r}{a}\right)^\alpha} + \Delta_s$$

for $r < a_s$.

The second core region, which has a radius a, immediately surrounds the first core region and has a refractive graded-index profile (also known as "alpha index profile") with respect to the optical cladding such as:

$$n_0 \cdot \sqrt{1-2\cdot\Delta\cdot\left(\frac{r}{a}\right)^\alpha}$$

for $a_s \leq r < a$.

Those having ordinary skill in the art will appreciate that the respective alpha values for the optical fiber's first core region and second core region might be identical but do not necessarily have to be the same. For example, an exemplary first core region might possess an alpha value of more than about 1.5 (1.5≤α≤∞), and an exemplary second core region might possess an alpha value of between about 1 and 5, such as between about 1.5 and 3 (e.g., 1.7≤α≤2.5). By way of further illustration, the first core region might possess a rectangular refractive-index profile (whereby α≈∞), and the second core region might possess a parabolic refractive-index profile (whereby α≈2).

The second core region presents the typical characteristics of a multimode optical fiber operating at a wavelength of 850 nanometers.

The first core region provides a radial portion of the optical fiber that has a step-index profile whose characteristics ($\Delta_s$ and $a_s$) with respect to the second region core facilitate the imposition of single-mode transmission conditions at a wavelength of 1550 nanometers while retaining the optical fiber's multimode characteristics at 850 nanometers.

Indeed, the refractive index profile depicted in FIG. 1 exhibits a graded-index core with a step index positioned (e.g., a refractive-index discontinuity) in the center of the optical core. The optical fiber's core is designed to provide optical mode matching at 1550 nanometers between the fundamental mode of a hybrid optical fiber according to the present invention and the fundamental mode of a standard single-mode optical fiber (SSMF).

In the exemplary optical fiber depicted in FIG. 1, the first core region's radius $a_s$ is about 6 microns, and the second core region's radius a is about 25 microns (with a tolerance of ±2 μm). Here, the parameter α of the optical core's index profile is about 2 for both the first core region and the second core region. The refractive index difference $\Delta_s$ corresponding to the step index may have a value of between about $3\times10^{-3}$ and $12\times10^{-3}$.

Generally speaking, the refractive index difference $\Delta_s$ and the radius $a_s$ of the first core region can be designed or otherwise configured to provide a satisfactory compromise in terms of optical properties (e.g., a high optical mode coupling ratio $$\left(\frac{|\gamma|^2}{\sum_i |\beta_i|^2}\right)$$

for single-mode transmissions at 1550 nanometers and a low dispersion modal (or a high bandwidth) for multimode transmissions at 850 nanometers.

In practice, to perform well in a high-bandwidth application, an optical fiber should have high quality optical transmission. For a given wavelength, this criterion may be characterized by the optical mode coupling ratio, which is given by the following equation:

$$\frac{|\gamma|^2}{\sum_i |\beta_i|^2} = \frac{|\langle E_{SMF}, E_{MMF}\rangle|^2}{\sum_i |\langle E_{SMF}, E_{MMF}^{(i)}\rangle|^2}$$

where,

γ is the optical power coupled into the fundamental mode;
$\beta_i$ is the optical power coupled into the higher order modes (HOMs), with i≤1;
$E_{SMF}$ is the electrical field of the fundamental mode of the single-mode optical fiber;
$E_{BF}$ is the electrical field of the fundamental mode of the multimode optical fiber; and
$\langle E_1|E_2\rangle = \iint E_1^* \cdot E_2 \cdot dS$ is the scalar product of fields $E_1$ and $E_2$.

This foregoing equation defines the ratio of optical power coupled between the fundamental mode and the higher order modes (HOMs). The less optical power that is coupled into the HOMs, the more the optical fiber's transmission quality is improved.

In one embodiment, (i) the refractive index difference $\Delta_s$ between the first core region and the second core region and (ii) the radius $a_s$ of the first core region satisfy the following inequality:

$0.0549 \cdot a_s^4 - 0.9053 \cdot a_s^3 + 5.483 \cdot a_s^2 - 14.39 \cdot a_s + 13.75 < 1000 \cdot \Delta_s < 1.11 \cdot a_s^2 - 6.9145 \cdot a_s + 17.94$.

In another particular embodiment, (i) the refractive index difference $\Delta_s$ between the first core region and the second core region and (ii) the radius $a_s$ of the first core region satisfy the following inequality:

$0.0373 \cdot a_s^4 - 0.6145 \cdot a_s^3 + 4.0286 \cdot a_s^2 - 12.217 \cdot a_s + 14.739 < 1000 \cdot \Delta_s < 0.9821 \cdot a_s^2 - 6.5036 \cdot a_s + 16.7$.

It should be noted that each of these two empirical inequalities helps to improve the fundamental mode matching at 1550 nanometers. The inventors have established these empirical inequalities based on an understanding that the fundamental mode matching can be assessed indirectly by comparing the mode field diameter of the fundamental mode of the hybrid optical fiber at 1550 nanometers and the fundamental mode of a standard single-mode optical fiber. These two empirical inequalities correspond to a mode field diameter difference of about 0.8 micron and 0.5 micron, respectively. Consequently, the fundamental mode diameter is smaller, the optical power coupled into the fundamental mode ($|\gamma|^2$) is higher, and the optical power coupled into the HOMs $$\left(\sum_i |\beta_i|^2\right)$$

is lower.

The advantages of the present invention will be more evident by comparing conventional optical fibers with an exemplary optical fiber according to the present invention. In this regard, Table 1 (below) shows optical-fiber profile parameters of a standard multimode optical fiber that has a refractive graded-index profile optimized for providing error-free transmission at a wavelength of 850 nanometers. That conventional multimode optical fiber is subjected to an optical signal of a wavelength λ of 1550 nanometers.

TABLE 1

| Examples | α | Δ | a | λ | $|\gamma|^2$ | $\sum_i |\beta_i|^2$ |
|---|---|---|---|---|---|---|
| 1 | 2 | 1.0% | 25 μm | 1550 nm | 95.3% | 4.7% |
| 2 | 2 | 2.0% | 31.25 μm | 1550 nm | 96.8% | 3.2% |

Table 2 (below) shows optical-fiber profile parameters of a hybrid optical fiber according to the present invention. The optical fiber exhibits a refractive index profile that respects the foregoing equation n(r) (above), and (i) the refractive index difference $\Delta_s$ between the first core region and the second core region and (ii) the radius $a_s$ of the first core region satisfy the following inequality:

$$0.0549 \cdot a_s^4 - 0.9053 \cdot a_s^3 + 5.483 \cdot a_s^2 - 14.39 \cdot a_s + 13.75 < 1000 \cdot \Delta_s < 1.11 \cdot a_s^2 - 6.9145 \cdot a_s + 17.94.$$

TABLE 2

| Examples | α | $a_s$ | $\Delta_s$ × 1000 | a | λ | $|\gamma|^2$ | $\sum_i |\beta_i|^2$ |
|---|---|---|---|---|---|---|---|
| 1 | 2 | 2 μm | 6 | 25 μm | 1550 nm | 99.93% | 0.07% |
| 2 | 2 | 2 μm | 5 | 25 μm | 1550 nm | 99.66% | 0.34% |
| 3 | 2 | 2 μm | 7 | 25 μm | 1550 nm | 99.94% | 0.06% |
| 4 | 2 | 3 μm | 3 | 25 μm | 1550 nm | 99.61% | 0.39% |

The data in Tables 1 and 2 demonstrate that, for about 30 meters of optical fiber, the optical power coupled in the fundamental mode of the conventional multimode optical fiber does not exceed 97 percent, whereas the optical power coupled in the fundamental mode of the hybrid optical fiber according to the invention clearly exceeds 99 percent.

Figure 2:
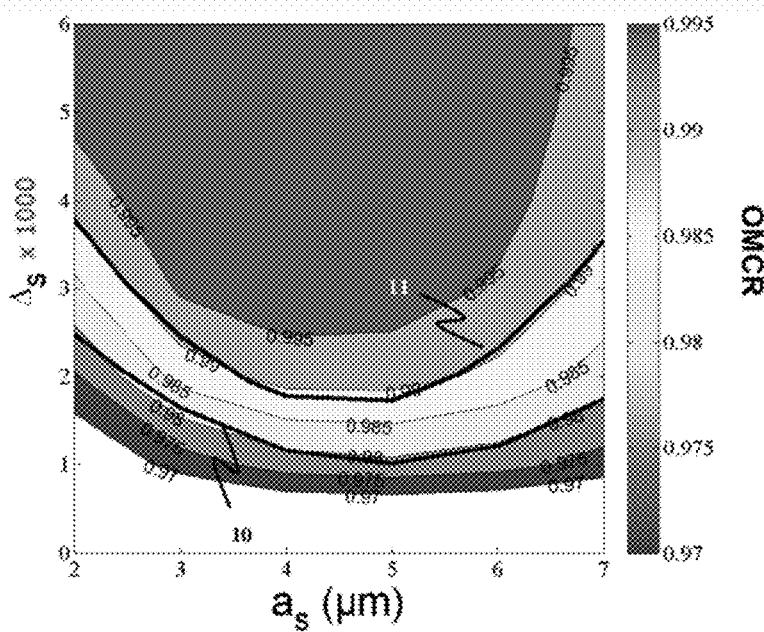
FIG. 2 graphically depicts the optical mode coupling ratio as a function of parameters of core index profile of a first exemplary optical fiber according to the present invention.

FIG. 2 graphically depicts simulated optical mode coupling ratio (OMCR) measurements as a function of the refractive step-index difference $\Delta_s$ and the radius $a_s$ of the first core region for an optical fiber having a core radius of 25 microns and a numerical aperture of 0.200.

With respect to FIG. 2, the left-hand y-axis depicts the first core region's refractive step-index difference $\Delta_s$ and the x-axis depicts the first core region's radius $a_s$. The values of optical mode coupling ratio, which correspond to a given pair of parameters ($\Delta_s$, $a_s$), are illustrated in shades of gray in the right-hand y-axis.

In FIG. 2, the curve 10 is defined by the following inequality, assuming that the optical power coupled into the fundamental mode is greater than 98 percent at a wavelength of 1550 nanometers (single-mode transmission):

$$\Delta_s > 0.17173 a_s^2 - 1.6926 a_s + 5.1835.$$

In FIG. 2, the curve 11 is defined by the following inequality, assuming that the optical power coupled into the fundamental mode is greater than 99 percent at a wavelength of 1550 nanometers (single-mode transmission):

$$\Delta_s > 0.31742 a_s^2 - 2.9046 a_s + 8.3221.$$

The values of OMCR situated above curves 10 and 11 provide the values for the parameters $\Delta_s$ and $a_s$ of the optical fiber's first core region for which the fundamental mode-matching is provided at a ratio of at least 98 percent and 99 percent, respectively, at 1550 nanometers.

Figure 3:
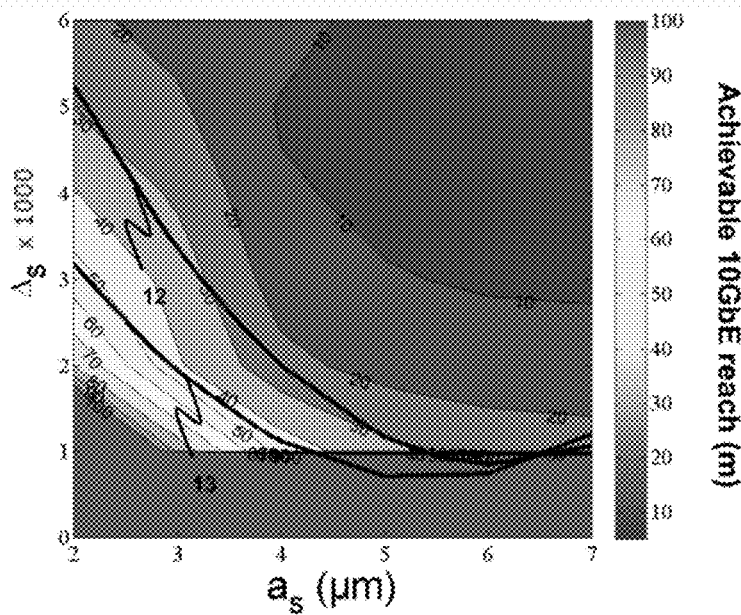
FIG. 3 graphically depicts the achievable 10 GbE reach as a function of parameters of core index profile of the first exemplary optical fiber according to the present invention.

FIG. 3 graphically depicts simulated achievable 10 GbE reach as a function of the refractive step-index difference $\Delta_s$ and the radius $a_s$ of the first core region for an optical fiber having a core radius of 25 microns and a numerical aperture of 0.200.

With respect to FIG. 3, the left-hand y-axis depicts the first core region's refractive step-index difference $\Delta_s$ and the x-axis depicts the first core region's radius $a_s$. The values of achievable 10 GbE reach, which are expressed in meters (m), at the wavelength of 850 nanometers, which correspond to a given pair of parameters ($\Delta_s$, $a_s$), are illustrated in shades of gray in the right-hand y-axis.

The term "10 GbE reach" refers to the maximum guaranteed transmission distance for which an optical fiber can operate at a nominal data rate of 10 Gbps with a bit error rate (or BER) of less than $10^{-12}$ when used with 10G-BASE-S sources. In this regard, the 10G-BASE-S sources are standardized sources for 10 GbE applications in accordance with the IEEE 802.3 standard.

In FIG. 3, the curve 12 is defined by the following inequality, assuming 10 GbE reach of 30 meters:

$$\Delta_s < 0.26184 a_s^2 - 3.1935 a_s + 10.5832.$$

In FIG. 3, the curve 13 is defined by the following inequality, assuming 10 GbE reach of 50 meters:

$$\Delta_s < 0.21308 a_s^2 - 2.3168 a_s + 6.9690.$$

The values below curves 12 and 13 provide the values for the parameters $\Delta_s$ and $a_s$ of the optical fiber's first core region for which, at a wavelength of 850 nanometers, the optical fiber's modal dispersion is sufficiently low such that the optical fiber can be employed in high data rate applications (e.g., 10 GbE applications) over 30 meters and 50 meters, respectively.

Figure 4:
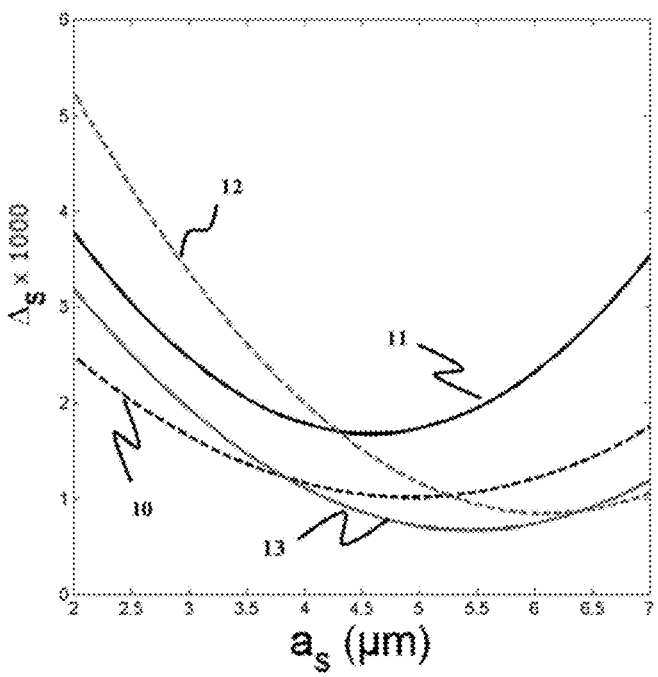
FIG. 4 graphically depicts the curves shown in FIGS. 2 and 3.

FIG. 4 depicts the respective curves 10, 11, 12, and 13 shown in FIGS. 2 and 3. FIG. 4 shows that the optical fiber has paired values ($\Delta_s$, $a_s$) for which the corresponding points should be situated between the curves 10 and 12, or between the curves 11 and 12, or between the curves 10 and 13, so that this optical fiber provides a satisfactory trade-off between the optical mode coupling ratio for single-mode transmissions at 1550 nanometers and the modal bandwidth for multimode transmissions at 850 nanometers. For example (and with reference to FIGS. 2-4), an optical fiber that possesses a first core region having a refractive step-index difference $\Delta_s$ of 2.5×10⁻³ and a radius of 3.5 microns will exhibit a value of OMCR of at least 99 percent at 1550 nanometers and an achievable 10 GbE reach of at least 30 meters at 850 nanometers. This modal dispersion at 850 nanometers is low enough to allow for an error-free multimode transmission at 850 nanometers using off-the-shelf 10 Gbps transceivers (typically implementing a VCSEL technology) and an error-free single-mode transmission at 1550 nanometers.

Figure 5:
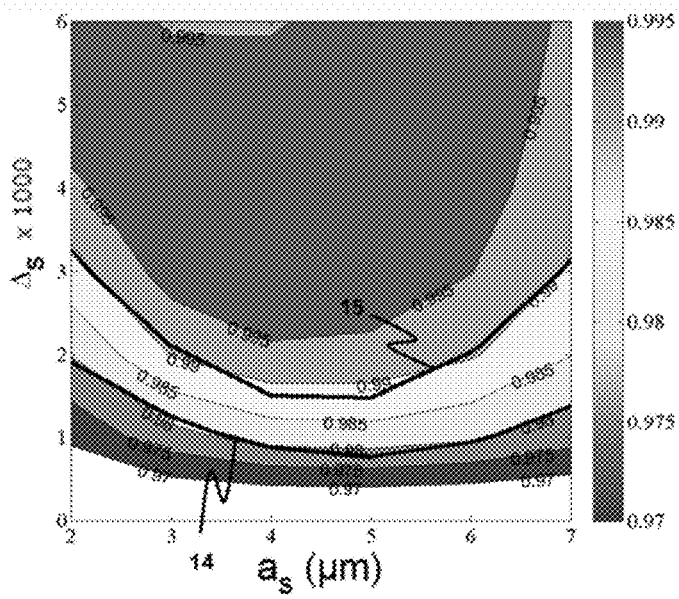
FIG. 5 graphically depicts the optical mode coupling ratio as a function of parameters of core index profile of a second exemplary optical fiber according to the present invention.

FIG. 5 graphically depicts simulated optical mode coupling ratio (OMCR) measurements as a function of the refractive step-index difference $\Delta_s$ and the radius $a_s$ of the first core region for an optical fiber having a core radius of 31.25 microns and a numerical aperture of 0.275.

In FIG. 5, the curve 14 is defined by the following inequality, assuming that the optical power coupled into the fundamental mode is greater than 98 percent at a wavelength of 1550 nanometers (single-mode transmission):

$$\Delta_s > 0.13774 a_s^2 - 1.3462 a_s + 4.0572.$$

In FIG. 5, the curve 15 is defined by the following inequality, assuming that the optical power coupled into the fundamental mode is greater than 99 percent at a wavelength of 1550 nanometers (single-mode transmission):

$$\Delta_s > 0.2839 a_s^2 - 2.5787 a_s + 7.2947.$$

The values of OMCR situated above curves 14 and 15 provide the values for the parameters $\Delta_s$ and $a_s$ of the optical fiber's first core region for which the fundamental mode-matching is provided at a ratio of at least 98 percent and 99 percent, respectively, at 1550 nanometers.

Figure 6:
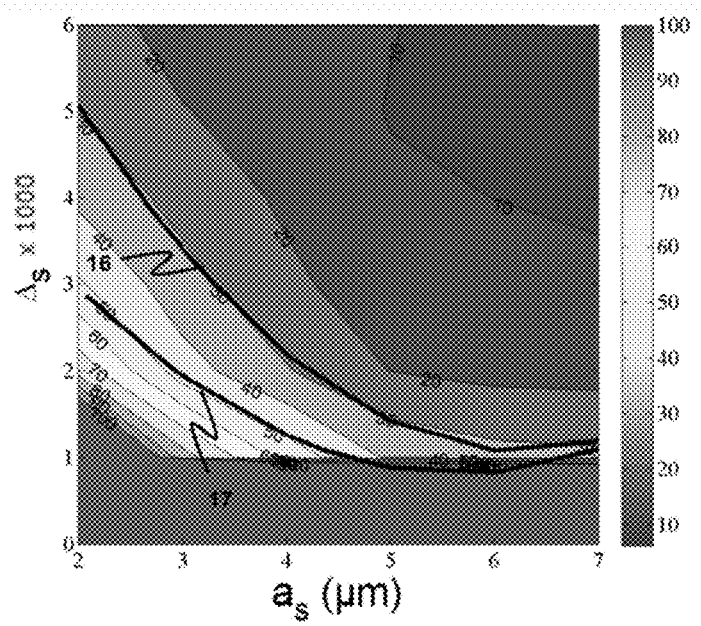
FIG. 6 graphically depicts the achievable 10 GbE reach as a function of parameters of core index profile of the second exemplary optical fiber according to the present invention.

FIG. 6 graphically depicts simulated achievable 10 GbE reach as a function of the refractive step-index difference $\Delta_s$ and the radius $a_s$ of the first core region for an optical fiber having a core radius of 31.25 microns and a numerical aperture of 0.275.

In FIG. 6, the curve 16 is defined by the following inequality, assuming a 10 GbE reach of 30 meters:

$$\Delta_s < 0.22044 a_s^2 - 2.7607 a_s + 9.7057.$$

In FIG. 6, the curve 17 is defined by the following inequality, assuming a 10 GbE reach of 50 meters:

$$\Delta_s < 0.15979 a_s^2 - 1.8078 a_s + 5.9286.$$

The values below curves 16 and 17 provide the values for the parameters $\Delta_s$ and $a_s$ of the optical fiber's first core region for which, at a wavelength of 850 nanometers, the optical fiber's modal dispersion is sufficiently low such that the optical fiber can be employed in high data rate applications (e.g., 10 GbE applications) over 30 meters and 50 meters, respectively.

Figure 7:
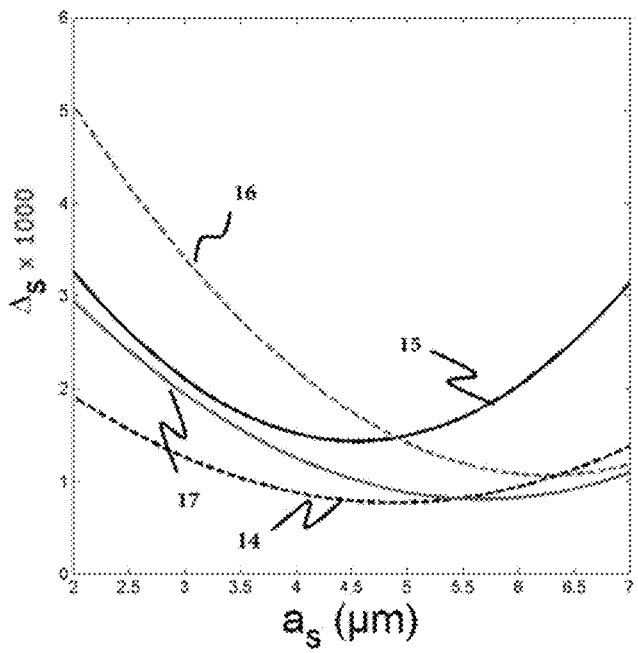
FIG. 7 graphically depicts the curves shown in FIGS. 5 and 6.

FIG. 7 depicts the respective curves 14, 15, 16, and 17 shown in FIGS. 5 and 6. FIG. 7 shows that the optical fiber has paired values ($\Delta_s$, $a_s$) for which the corresponding points should be situated between the curves 14 and 16, or between the curves 15 and 16, or between the curves 14 and 17, so that this optical fiber provides a satisfactory trade-off between the optical mode coupling ratio for single-mode transmissions at 1550 nanometers and the modal bandwidth for multimode transmissions at 850 nanometers. For example (and with reference to FIGS. 5-7), an optical fiber that possesses a first core region having a refractive step-index difference $\Delta_s$ of $2.0 \times 10^{-3}$ and a radius of 4 microns will exhibit a value of OMCR of at least 99 percent at 1550 nanometers and an achievable 10 GbE reach of at least 30 meters at 850 nanometers. This modal dispersion at 850 nanometers is low enough to allow for an error-free multimode transmission at 850 nanometers using off-the-shelf 10 Gbps transceivers (typically implementing a VCSEL technology) and an error-free single-mode transmission at 1550 nanometers.

Figure 8:
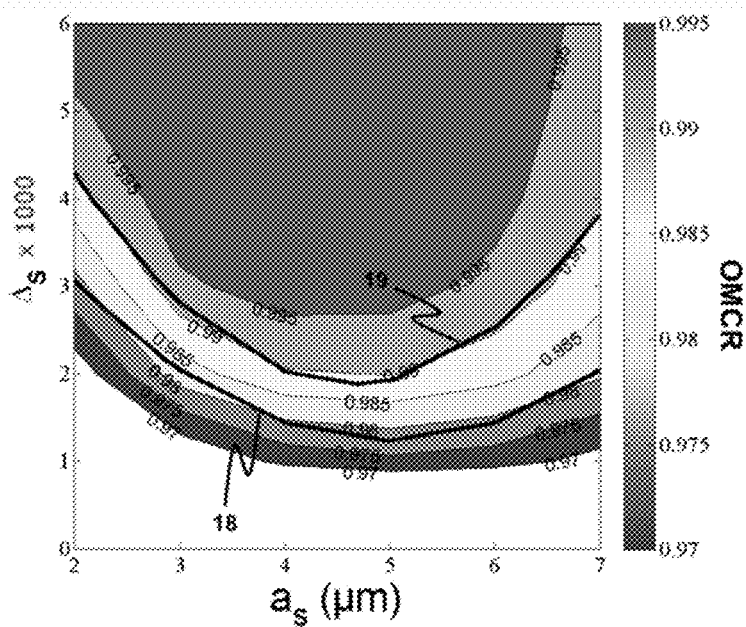
FIG. 8 graphically depicts the optical mode coupling ratio as a function of parameters of core index profile of a third exemplary optical fiber according to the present invention.

FIG. 8 graphically depicts simulated optical mode coupling ratio (OMCR) measurements as a function of the refractive step-index difference $\Delta_s$ and the radius $a_s$ of the first core region for an optical fiber having a core radius of 40 microns and a numerical aperture of 0.290.

In FIG. 8, the curve 18 is defined by the following inequality, assuming that the optical power coupled into the fundamental mode is greater than 98 percent at a wavelength of 1550 nanometers (single-mode transmission):

$$\Delta_s > 0.20185 a_s^2 - 2.0205 a_s + 6.2914.$$

In FIG. 8, the curve 19 is defined by the following inequality, assuming that the optical power coupled into the fundamental mode is greater than 99 percent at a wavelength of 1550 nanometers (single-mode transmission):

$$\Delta_s > 0.34616 a_s^2 - 3.211 a_s + 9.3320.$$

The values of OMCR situated above curves 18 and 19 provide the values for the parameters $\Delta_s$ and $a_s$ of the optical fiber's first core region for which the fundamental mode-matching is provided at a ratio of at least 98 percent and 99 percent, respectively, at 1550 nanometers.

Figure 9:
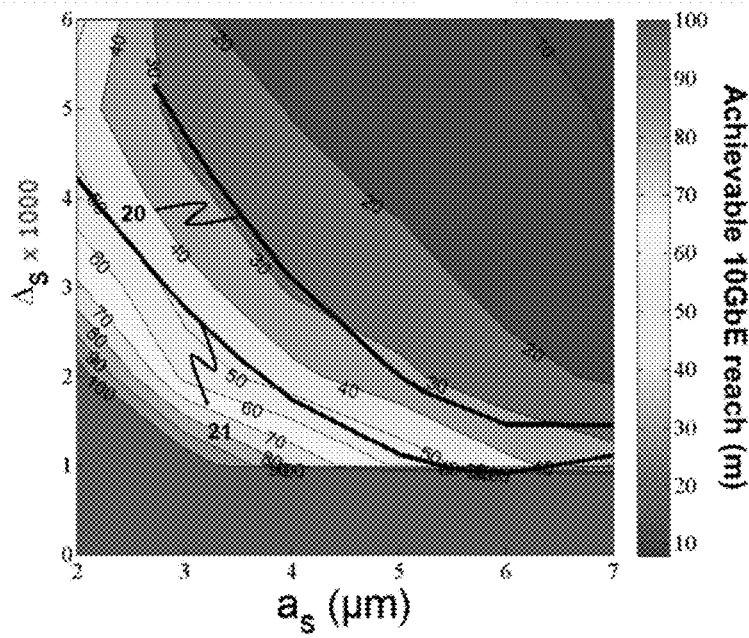
FIG. 9 graphically depicts the achievable 10 GbE reach as a function of parameters of core index profile of the third exemplary optical fiber according to the present invention.

FIG. 9 graphically depicts simulated achievable 10 GbE reach as a function of the refractive step-index difference $\Delta_s$ and the radius $a_s$ of the first core region for an optical fiber having a core radius of 40 microns and a numerical aperture of 0.290.

In FIG. 9, the curve 20 is defined by the following inequality, assuming a 10 GbE reach of 30 meters:

$$\Delta_s < 0.26946 a_s^2 - 3.5101 a_s + 12.8205.$$

In FIG. 9, the curve 21 is defined by the following inequality, assuming a 10 GbE reach of 50 meters:

$$\Delta_s < 0.20605 a_s^2 - 2.4798 a_s + 8.3655.$$

The values below curves 20 and 21 provide the values for the parameters $\Delta_s$ and $a_s$ of the optical fiber's first core region for which, at a wavelength of 850 nanometers, the optical fiber's modal dispersion is sufficiently low such that the optical fiber can be employed in high data rate applications (e.g., 10 GbE applications) over 30 meters and 50 meters, respectively.

Figure 10:
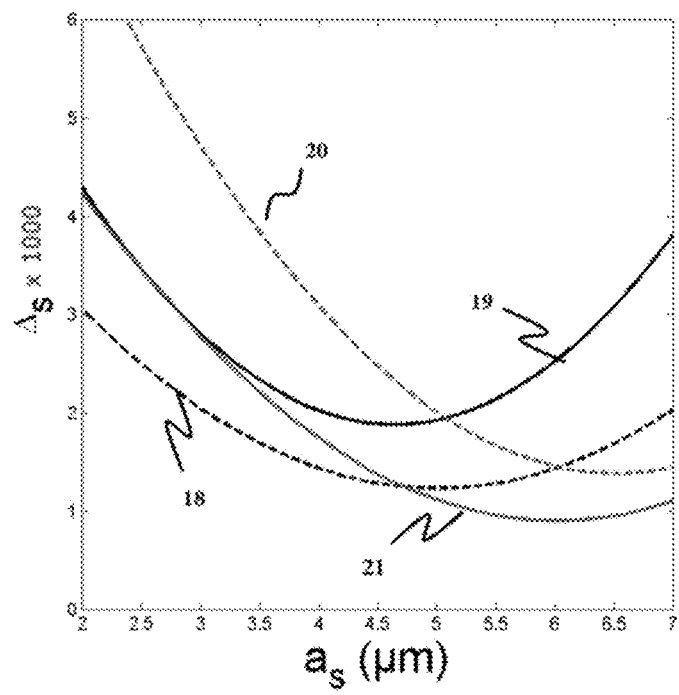
FIG. 10 graphically depicts the curves shown in FIGS. 8 and 9.

FIG. 10 depicts the respective curves 18, 19, 20, and 21 shown in FIGS. 8 and 9. FIG. 10 shows that the optical fiber has paired values ($\Delta_s$, $a_s$) for which the corresponding points should be situated between the curves 18 and 20, or between the curves 19 and 20, or between the curves 18 and 21, or between the curves 19 and 21, so that this optical fiber provides a satisfactory trade-off between the optical mode coupling ratio for single-mode transmissions at 1550 nanometers and the modal bandwidth for multimode transmissions at 850 nanometers.

For example (and with reference to FIGS. 8-10), an optical fiber that possesses a first core region having a refractive step-index difference $\Delta_s$ of $2.0 \times 10^{-3}$ and a radius of 4 microns will exhibit a value of OMCR of at least 99 percent at 1550 nanometers and an achievable 10 GbE reach of at least 30 meters at 850 nanometers. This modal dispersion at 850 nanometers is low enough to allow for an error-free multimode transmission at 850 nanometers using off-the-shelf 10 Gbps transceivers (typically implementing a VCSEL technology) and an error-free single-mode transmission at 1550 nanometers.

Figure 11:
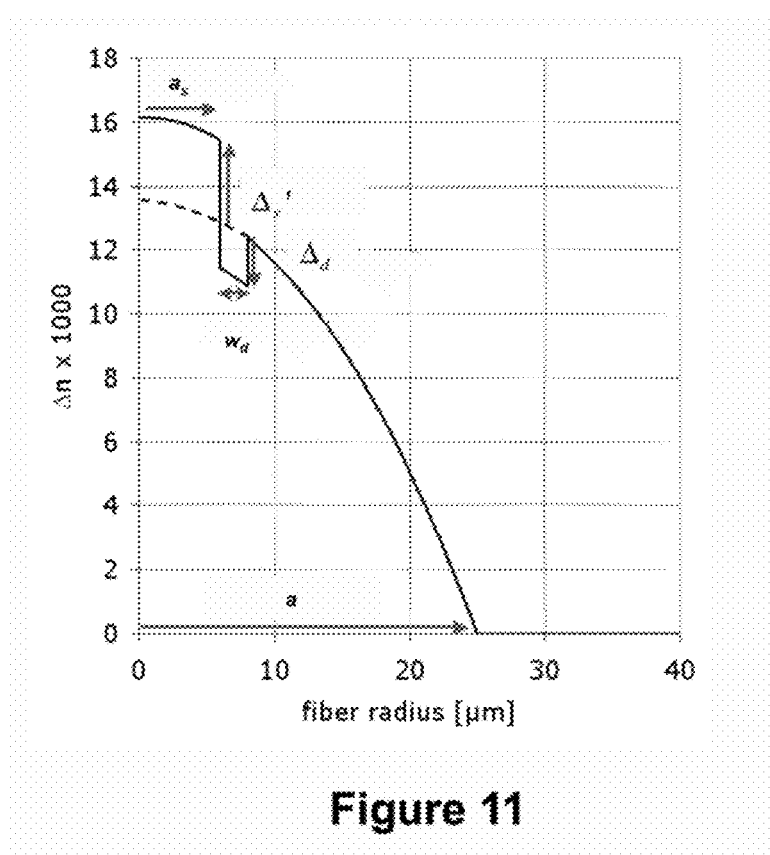
FIG. 11 graphically depicts the refractive index profile of a second embodiment of an exemplary optical fiber according to the present invention.

FIG. 11 depicts the refractive index profile of an exemplary optical fiber according to a second embodiment of the present invention. FIG. 11 describes the relationship between the refractive index value n and the distance r from the center of the optical fiber. This second embodiment depicted in FIG. 11 differs from the first embodiment depicted in FIG. 1 in that the optical fiber includes a depressed area (i.e., a depressed trench) positioned between the first core region and the second core region. As shown in FIG. 11, the depressed trench may immediately surround the first core region (e.g., the depressed trench may be contiguously positioned between the optical core's first core region and the optical core's second core region). The depressed trench further reduces modal dispersion for multimode transmissions at a wavelength of 850 nanometers.

The depressed trench, which defines a refractive index difference $\Delta_d$ with respect to the second core region, typically has a width $w_d$ of between about 1 micron and 8 microns (e.g., between about 1.5 microns and 7.5 microns, such as 2.5-5.5 microns).

The depressed trench depicted in FIG. 11 has a width $w_d$ of about 4 microns and a refractive index difference $\Delta_d$ with respect to the second core region of about $-1.3 \times 10^{-3}$. The refractive index difference $\Delta_s'$ of the step-index first core region is about $2.5 \times 10^{-3}$.

In practice, the refractive index difference $\Delta_d$ of the depressed area and the refractive index difference $\Delta_d$ of the first core region may be determined using the following equation: $|\Delta_d| + \Delta_s' = \Delta_s$, wherein $\Delta_s$ satisfies at least one of the inequalities described previously with respect to the exemplary optical fiber according to a first embodiment of the present invention. For example, the sum of (i) the depressed trench's refractive index difference $\Delta_d$ and (ii) the first core region's refractive index difference $\Delta_s'$ might be between about $3 \times 10^{-3}$ and $12 \times 10^{-3}$, with $\Delta_d$ between $-4 \times 5 \cdot 10^{-3}$ and $-0.5 \times 10^{-3}$.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (pm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

Primary preforms may be manufactured via outside vapor deposition techniques, such as Outside Vapor Deposition (OVD) and Vapor Axial Deposition (VAD). Alternatively, primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located near the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube (Overton et al.), which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element (Overton et al.), which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method (Lock et al.), and U.S. Pat. No. 7,665,902 for a Modified Pre-Ferrulized Communication Cable Assembly and Installation Method (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylori. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or tilted pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber (Overton); U.S. Pat. No. 8,265,442 for a Microbend-Resistant Optical Fiber (Overton); U.S. Pat. No. 8,145,025 for a Single-Mode Optical Fiber Having Reduced Bending Losses (de Montmorillon et al.); U.S. Pat. No. 7,889,960 for a Bend-Insensitive Single-Mode Optical Fiber (de Montmorillon et al.); U.S. Patent Application Publication No. US2010/0021170 A1 for a Wavelength Multiplexed Optical System with Multimode Optical Fibers (Lumineau et al.); U.S. Pat. No. 7,995,888 for a Multimode Optical Fibers (Gholami et al.); U.S. Patent Application Publication No. US2010/0119202 A1 for a Reduced-Diameter Optical Fiber (Overton); U.S. Patent Application Publication No. US2010/0142969 A1 for a Multimode Optical System (Gholami et al.); U.S. Pat. No. 8,259,389 for an Amplifying Optical Fiber and Method of Manufacturing (Pastouret et al.); U.S. Patent Application Publication No. US2010/0135627 A1 for an Amplifying Optical Fiber and Production Method (Pastouret et al.); U.S. Patent Application Publication No. US2010/0142033 for an Ionizing Radiation-Resistant Optical Fiber Amplifier (Regnier et al.); U.S. Pat. No. 8,274,647 for a Method of Classifying a Graded-Index Multimode Optical Fiber (Gholami et al.); U.S. Patent Application Publication No. US2010/0189397 A1 for a Single-Mode Optical Fiber (Richard et al.); U.S. Pat. No. 8,290,324 for a Single-Mode Optical Fiber Having an Enlarged Effective Area (Sillard et al.); U.S. Pat. No. 8,301,000 for a Single-Mode Optical Fiber (Sillard et al.); U.S. Patent Application Publication No. US2010/0214649 A1 for an Optical Fiber Amplifier Having Nanostructures (Burov et al.); U.S. Pat. No. 8,009,950 for a Multimode Fiber (Molin et al.); U.S. Patent Application Publication No. US2010/0310218 A1 for a Large Bandwidth Multimode Optical Fiber Having a Reduced Cladding Effect (Molin et al.); U.S. Patent Application Publication No. US2011/0058781 A1 for a Multimode Optical Fiber Having Improved Bending Losses (Molin et al.); U.S. Pat. No. 8,340,488 for a Multimode Optical Fiber (Molin et al.); U.S. Patent Application Publication No. US2011/0069724 A1 for an Optical Fiber for Sum-Frequency Generation (Richard et al.); U.S. Patent Application Publication No. US2011/0116160 A1 for a Rare-Earth-Doped Optical Fiber Having Small Numerical Aperture (Boivin et al.); U.S. Pat. No. 8,280,213 for a High-Bandwidth, Multimode Optical Fiber with Reduced Cladding Effect (Molin et al.); U.S. Patent Application Publication No. US2011/0123162 A1 for a High-Bandwidth, Dual-Trench-Assisted Multimode Optical Fiber (Molin et al.); U.S. Pat. No. 8,406,593 for a Multimode Optical Fiber with Low Bending Losses and Reduced Cladding Effect (Molin et al.); U.S. Pat. No. 8,428,410 for a High-Bandwidth Multimode Optical Fiber Having Reduced Bending Losses (Molin et al.); U.S. Patent Application Publication No. US2011/0188826 A1 for a Non-Zero Dispersion Shifted Optical Fiber Having a Large Effective Area (Sillard et al.); U.S. Patent Application Publication No. US2011/0188823 A1 for a Non-Zero Dispersion Shifted Optical Fiber Having a Short Cutoff Wavelength (Sillard et al.); U.S. Patent Application Publication No. 2011/0217012 A1 for a Broad-Bandwidth Multimode Optical Fiber Having Reduced Bending Losses (Bigot-Astruc et al.); U.S. Pat. No. 8,428,411 for a Single-Mode Optical Fiber (de Montmorillon et al.); U.S. Patent Application Publication No. 2012/0051703 A1 for a Single-Mode Optical Fiber (Bigot-Astruc et al.); U.S. Patent Application Publication No. 2012/0040184 A1 for a Method of Fabricating an Optical Fiber Preform (de Montmorillon et al.); U.S. Patent Application Publication No. 2012/0092651 A1 for a Multimode Optical Fiber Insensitive to Bending Losses (Molin et al.); U.S. Patent Application Publication No. 2012/0134376 A1 for a Radiation-Insensitive Optical Fiber Doped with Rare Earths (Burov et al.); U.S. Patent Application Publication No. 2012/0148206 A1 for a Rare-Earth-Doped Optical Fiber (Boivin et al.); U.S. Patent Application Publication No. 2012/0195549 A1 for a Broad-Bandwidth Optical Fiber (Molin et al.); U.S. Pat. No. 8,391,661 for a Multimode Optical Fiber (Molin et al.); U.S. Patent Application Publication No. 2012/0224254 A1 for a Rare-Earth-Doped Amplifying Optical Fiber (Burov et al.); U.S. Patent Application Publication No. 2012/0243843 A1 for a Bend-Resistant Multimode Optical Fiber, (Molin et al.); U.S. Patent Application Publication No. 2012/0251062 A1 for a Multimode Optical Fiber, (Molin et al.); U.S. Patent Application Publication No. 2012/0275751 A1 for a High-Bandwidth, Radiation-Resistant Multimode Optical Fiber, (Krabshuis et al.); U.S. Patent Application Publication No. 2012/0301093 A1 for a Single-Mode Optical Fiber, (Sillard et al.); U.S. Patent Application Publication No. 2012/0315006 A1 for a Single-Mode Optical Fiber, (Sillard et al.) U.S. Patent Application Publication No. 2013/0004135 for a Multimode Optical Fiber, (Bigot-Astruc et al.); U.S. Patent Application Publication No. 2013/0028564 A1 for a Trench-Assisted Multimode Optical Fiber, (Molin); and U.S. patent application Ser. No. 13/657,251 for an Hydrogen-Sensing Optical Fiber, filed Oct. 22, 2012, (Burov et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels (Lookadoo et al.); U.S. Patent Application Publication No. US2009/0297107 A1 for an Optical Fiber Telecommunication Cable (Tatat); U.S. Pat. No. 8,195,018 for a Buffer Tube with Adhesively Coupled Optical Fibers and/or Water-Swellable Element; U.S. Pat. No. 8,401,353 for an Optical Fiber Cable Assembly (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments (Overton); U.S. Pat. No. 8,041,167 for an Optical-Fiber Loose Tube Cables (Overton); U.S. Pat. No. 8,145,026 for a Reduced-Size Flat Drop Cable (Overton et al.); U.S. Pat. No. 8,165,439 for ADSS Cables with High-Performance Optical Fiber (Overton); U.S. Pat. No. 8,041,168 for Reduced-Diameter Ribbon Cables with High-Performance Optical Fiber (Overton); U.S. Pat. No. 8,031,997 for a Reduced-Diameter, Easy-Access Loose Tube Cable (Overton); U.S. Pat. No. 8,346,040 for a Buffered Optical Fiber (Testu et al.); U.S. Patent Application Publication No. US2010/0154479 A1 for a Method and Device for Manufacturing an Optical Preform (Milicevic et al.); U.S. Patent Application Publication No. US2010/0166375 for a Perforated Water-Blocking Element (Parris); U.S. Pat. No. 8,314,408 for a UVLED Apparatus for Curing Glass-Fiber Coatings (Hartsuiker et al.); U.S. Patent Application Publication No. US2010/0202741 A1 for a Central-Tube Cable with High-Conductivity Conductors Encapsulated with High-Dielectric-Strength Insulation (Ryan et al.); U.S. Patent Application Publication No. US2010/0215328 A1 for a Cable Having Lubricated, Extractable Elements (Tatat et al.); U.S. Patent Application Publication No. US2011/0026889 A1 for a Tight-Buffered Optical Fiber Unit Having Improved Accessibility (Risch et al.); U.S. Pat. No. 8,306,380 for Methods and Devices for Cable Insertion into Latched Conduit (Leatherman et al.); U.S. Patent Application Publication No. 2011/0069932 A1 for a High-Fiber-Density Optical-Fiber Cable (Overton et al.); U.S. Patent Application Publication No. 2011/0091171 A1 for an Optical-Fiber Cable Having High Fiber Count and High Fiber Density (Tatat et al.); U.S. Patent Application Publication No. 2011/0176782 A1 for a Water-Soluble Water-Blocking Element (Parris); U.S. Patent Application Publication No. 2011/0268400 A1 for a Data-Center Cable (Louie et al.); U.S. Patent Application Publication No. 2011/0268398 A1 for a Bundled Fiber Optic Cables (Quinn et al.); U.S. Patent Application Publication No. 2011/0287195 A1 for a Curing Apparatus Employing Angled UVLEDs (Molin); U.S. Patent Application Publication No. 2012/0009358 for a Curing Apparatus Having UV Sources That Emit Differing Ranges of UV Radiation (Gharbi et al.); U.S. Patent Application Publication No. 2012/0014652 A1 for a Adhesively Coupled Optical Fibers and Enclosing Tape (Parris); U.S. Patent Application Publication No. 2012/0040105 A1 for a Method and Apparatus Providing Increased UVLED Intensity (Overton); U.S. Patent Application Publication No. 2012/0057833 A1 for an Optical-Fiber Module Having Improved Accessibility (Tatat); U.S. Patent Application Publication No. 2012/0213483 A1 for an Optical-Fiber Interconnect Cable (Risch et al.); U.S. patent application Ser. No. 13/683,555 for a PCVD Method and Apparatus, filed Nov. 21, 2012, (Milicevic et al.); and U.S. patent application Ser. No. 13/768,280 for a Loose-Tube Optical-Fiber Cable, filed Feb. 15, 2013, (Lowell et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. In the figures, identical elements and steps are designated by the same numerical references. Unless otherwise noted, specific terms have been used in a generic and descriptive sense and not for purposes of limitation.

The invention claimed is:
1. An optical system, comprising:
a hybrid optical fiber connected to a single-mode optical fiber, wherein, during transmissions at a wavelength of 1550 nanometers, at least 98 percent of the power of the single-mode optical fiber's fundamental mode is coupled into the hybrid optical fiber's fundamental mode;
wherein the hybrid optical fiber comprises:
an optical core including (i) a first core region having a radius $a_s$ of between 1.5 microns and 9 microns, and (ii) a second core region contiguously surrounding the first core region, the second core region having a radius a of at least 15 microns;
an optical cladding surrounding the optical core;
wherein the optical core's first and second core regions are such that the optical core has a refractive index profile n(r) defined by the following equation:

$$n(r) = \begin{cases} n_0 \cdot \sqrt{1 - 2 \cdot \Delta \cdot \left(\frac{r}{a}\right)^\alpha} + \Delta_s & r < a_s \\ n_0 \cdot \sqrt{1 - 2 \cdot \Delta \cdot \left(\frac{r}{a}\right)^\alpha} & a_s \leq r < a \end{cases}$$

where,
$a_s$ is the radius of the first core region;
a is the radius of the second core region;
$\Delta_s$ is a positive step refractive index difference between the first core region and the second core region;
$n_0$ is the maximum refractive index of the second core region;

α is a non-dimensional parameter that defines the index profile shape of the second core region, wherein the non-dimensional parameter α is between 1 and 5;

Δ is the normalized refractive index difference defined by the relationship $$\Delta = \frac{n_0^2 - n_1^2}{2n_0^2},$$

where $n_1$ is the minimum refractive index of the second core region.

2. The optical system according to claim 1, wherein for the hybrid optical fiber the radius $a_s$ of the first core region is between 2 microns and 4 microns.

3. The optical system according to claim 1, wherein for the hybrid optical fiber the non-dimensional parameter α is between about 1.7 and 2.5.

4. The optical system according to claim 1, wherein for the hybrid optical fiber (i) the refractive index difference $\Delta_s$ between the first core region and the second core region and (ii) the radius $a_s$ of the first core region satisfy the following inequality:

$0.0549a_s^4 - 0.9053a_s^3 + 5.483a_s^2 - 14.39a_s + 13.75 < 1000 \cdot \Delta_s < 1.11a_s^2 6.9145a_s + 17.94$.

5. The optical system according to claim 1, wherein for the hybrid optical fiber (i) the refractive index difference $\Delta_s$ between the first core region and the second core region and (ii) the radius $a_s$ of the first core region satisfy the following inequality:

$0.0373a_s^4 - 0.6145a_s^3 + 4.0286a_s^2 - 12.217a_s + 14.739 < 1000 \cdot \Delta_s < 0.9821a_s^2 - 6.5036a_s + 16.7$.

6. The optical system according to claim 1, wherein for the hybrid optical fiber:

the radius a of the second core region is 25 microns±2 microns, and (i) the refractive index difference $\Delta_s$ between the first core region and the second core region and (ii) the radius $a_s$ of the first core region satisfy the following inequality:

$0.17173a_s^2 1.6926a_s + 5.1835 < \Delta_s < 0.26184a_s^2 - 3.1935a_s + 10.5832$.

7. The optical system according to claim 1, wherein for the hybrid optical fiber:

the radius a of the second core region is 25 microns±2 microns, and (i) the refractive index difference $\Delta_s$ between the first core region and the second core region and (ii) the radius $a_s$ of the first core region satisfy the following inequality:

$0.17173a_s^2 - 1.6926a_s + 5.1835 < \Delta_s < 0.21308a_s^2 - 2.3168a_s + 6.9690$.

8. The optical system according to claim 1, wherein for the hybrid optical fiber:

the radius a of the second core region is 25 microns±2 microns, and (i) the refractive index difference $\Delta_s$ between the first core region and the second core region and (ii) the radius $a_s$ of the first core region satisfy the following inequality:

$0.31742a_s^2 - 2.9046a_s + 8.3221 < \Delta_s < 0.26184a_s^2 - 3.1935a_s + 10.5832$.

9. The optical system according to claim 1, wherein for the hybrid optical fiber:

the radius a of the second core region is 31.25 microns±2 microns, and (i) the refractive index difference $\Delta_s$ between the first core region and the second core region and (ii) the radius $a_s$ of the first core region satisfy the following inequality:

$0.13774a_s^2 - 1.3462a_s + 4.0572 < \Delta_s < 0.22044a_s^2 - 2.7607a_s + 9.7057$.

10. The optical system according to claim 1, wherein for the hybrid optical fiber:

the radius a of the second core region is 31.25 microns±2 microns, and (i) the refractive index difference $\Delta_s$ between the first core region and the second core region and (ii) the radius $a_s$ of the first core region satisfy the following inequality:

$0.2839a_s^2 - 2.5787a_s + 7.2847 < \Delta_s < 0.22044a_s^2 - 2.7607a_s + 9.7057$.

11. The optical system according to claim 1, wherein for the hybrid optical fiber:

the radius a of the second core region is 31.25 microns±2 microns, and (i) the refractive index difference $\Delta_s$ between the first core region and the second core region and (ii) the radius $a_s$ of the first core region satisfy the following inequality:

$0.13774a_s^2 - 1.3462a_s + 4.0572 < \Delta_s < 0.15979a_s^2 - 1.8078a_s + 5.9286$.

12. The optical system according to claim 1, wherein for the hybrid optical fiber:

the radius a of the second core region is 40 microns±2 microns, and (i) the refractive index difference $\Delta_s$ between the first core region and the second core region and (ii) the radius $a_s$ of the first core region satisfy the following inequality:

$0.20185a_s^2 - 2.0205a_s + 6.2914 < \Delta_S < 0.26946a_s^2 - 3.5101a_s + 12.8205$.

13. The optical system according to claim 1, wherein for the hybrid optical fiber the radius $a_s$ of the first core region is between 1.5 microns and 4.5 microns.

14. The optical system according to claim 1, wherein, during transmissions at a wavelength of 1550 nanometers, at least 99 percent of the power of the single-mode optical fiber's fundamental mode is coupled into the hybrid optical fiber's fundamental mode.

\* \* \* \* \*

UNITED STATES PATENT AND TRADEMARK OFFICE
CERTIFICATE OF CORRECTION

PATENT NO. : 9,563,012 B2
APPLICATION NO. : 13/872397
DATED : February 7, 2017
INVENTOR(S) : Molin et al.

It is certified that error appears in the above-identified patent and that said Letters Patent is hereby corrected as shown below:

In the Specification

Column 5, delete Lines 49 and 50 and insert:
-- $0.0373 \cdot a_s^4 - 0.6145 \cdot a_s^3 + 4.0286 \cdot a_s^2 - 12.217 \cdot a_s + 14.739 < 1000 \cdot \Delta_s < 0.9821 \cdot a_s^2 - 6.5036 \cdot a_s + 16.7$ --

Column 10, delete Line 33 and insert:
-- modes (HOMs), with i ≥ 1; --

Column 10, delete Line 36 and insert:
-- $E_{MMF}$ is the electrical field of the fundamental mode of the --

Column 15, delete Line 23 and insert:
-- depressed area and the refractive index difference $\Delta_s$ of the --

Column 22, delete Line 58 and insert:
-- or pylon. An aerial cable may be self-supporting, or secured --

Column 23, delete Line 37 and insert:
-- (FTTE), fiber-to-the-curb (FTTC), fiber-to-the-building --

Column 27, delete Line 33 and insert:
-- (Lovie et al.); U.S. Pat. No. 7,970,247 for a Buffer Tubes for --

Column 28, delete Line 2 and insert:
-- Center Cable (Lovie et al.); U.S. Patent Application Publi- --

Signed and Sealed this
Tenth Day of July, 2018

Andrei Iancu
*Director of the United States Patent and Trademark Office*

CERTIFICATE OF CORRECTION (continued)
U.S. Pat. No. 9,563,012 B2

In the Claims

Column 29, Claim 4, delete Lines 25 and 26 and insert:
-- $0.0549\, a_s^4 - 0.9053\, a_s^3 + 5.483\, a_s^2 - 14.39\, a_s + 13.75 < 1000 \cdot \Delta_s < 1.11\, a_s^2 - 6.9145\, a_s + 17.94$ --

Column 29, Claim 6, delete Lines 43 and 44 and insert:
-- $0.17173 a_s^2 - 1.6926 a_s + 5.1835 < \Delta_s < 0.26184 a_s^2 - 3.1935 a_s + 10.5832.$ --

Column 30, Claim 12, delete Lines 45 and 46 and insert:
-- $0.20185\, a_s^2 - 2.0205\, a_s + 6.2914 < \Delta_s < 0.26946\, a_s^2 - 3.5101\, a_s + 12.8205.$ --